United States Patent
Islam et al.

(10) Patent No.: US 10,493,432 B2
(45) Date of Patent: Dec. 3, 2019

(54) PHOTOCATALYST / CARBON NANOTUBE AEROGEL COMPOSITES

(71) Applicant: Carnegie Mellon University, Pittsburgh, PA (US)

(72) Inventors: Mohammad F. Islam, Pittsburgh, PA (US); Paul A. Salvador, Pittsburgh, PA (US); Gregory S. Rohrer, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 108 days.

(21) Appl. No.: 15/932,257

(22) Filed: Feb. 16, 2018

(65) Prior Publication Data

US 2018/0229219 A1   Aug. 16, 2018

Related U.S. Application Data

(60) Provisional application No. 62/600,252, filed on Feb. 16, 2017.

(51) Int. Cl.
*C01B 32/158*   (2017.01)
*C01B 32/159*   (2017.01)
(Continued)

(52) U.S. Cl.
CPC ............ *B01J 23/42* (2013.01); *B01J 21/063* (2013.01); *B01J 21/185* (2013.01); *B01J 35/004* (2013.01);
(Continued)

(58) Field of Classification Search
CPC ........ B01J 23/42; B01J 21/063; B01J 21/185; B01J 35/0006; B01J 35/0013;
(Continued)

(56) References Cited

U.S. PATENT DOCUMENTS

| 9,208,919 B2 * | 12/2015 | Kong ............... H01B 1/02 |
| 2007/0284557 A1 | 12/2007 | Gruner et al. |

(Continued)

FOREIGN PATENT DOCUMENTS

| CA | 2 768 657 | * | 1/2011 | ............... H01G 9/00 |
| CA | 2768657 | | 1/2011 | |
| CN | 10-5664919 | * | 6/2016 | ............... B01J 23/30 |

OTHER PUBLICATIONS

Seung-woo Lee et al., "Formation of anatase TiO2 nanoparticles on carbon nanotubes." Chemical Communications, pp. 780-781 . (Year: 2003).*

(Continued)

*Primary Examiner* — Patricia L. Hailey
(74) *Attorney, Agent, or Firm* — Fish & Richardson P.C.

(57) ABSTRACT

Forming a photocatalyst/aerogel composite includes contacting an aerogel including a porous carbon nanotube network with a solution including a photocatalyst precursor to yield a wet gel. The porous carbon nanotube network includes carbon nanotubes, nodes, and struts. Each node is defined by a region in which two of the carbon nanotubes are in direct contact with each other, and each strut is defined by one of the carbon nanotubes extending between a first node and a second node. Forming the photocatalyst/aerogel composite further includes initiating a chemical reaction in the wet gel to form, on the nodes and struts, photocatalyst nanoparticles from the photocatalyst precursor, and removing liquid from the wet gel to yield an aerogel composite defining pores and including the photocatalyst nanoparticles. The photocatalyst nanoparticles are covalently bonded to the nodes and the struts throughout the porous carbon nanotube network.

20 Claims, 9 Drawing Sheets

(51) Int. Cl.
  *B01J 23/42* (2006.01)
  *B01J 21/06* (2006.01)
  *B01J 21/18* (2006.01)
  *B01J 37/03* (2006.01)
  *B01J 35/00* (2006.01)
  *B01J 35/02* (2006.01)

(52) U.S. Cl.
  CPC ......... *B01J 35/0006* (2013.01); *B01J 35/006* (2013.01); *B01J 35/0013* (2013.01); *B01J 35/02* (2013.01); *B01J 37/035* (2013.01); *B01J 37/036* (2013.01)

(58) Field of Classification Search
  CPC ........ B01J 35/004; B01J 35/006; B01J 35/02; C01B 32/158; C01B 32/159
  USPC ....... 502/185, 305, 326, 329, 331, 338, 342, 502/350, 353, 355; 516/98
  See application file for complete search history.

(56) References Cited

U.S. PATENT DOCUMENTS

| | | | |
|---|---|---|---|
| 2008/0045770 A1* | 2/2008 | Sigmund | A61L 9/205 588/299 |
| 2009/0175757 A1* | 7/2009 | Yao | C04B 41/009 422/4 |
| 2010/0092371 A1 | 4/2010 | Backov et al. | |
| 2010/0187484 A1 | 7/2010 | Worsley et al. | |
| 2010/0190639 A1* | 7/2010 | Worsley | B01J 21/063 502/183 |
| 2011/0024698 A1 | 2/2011 | Worsley et al. | |
| 2011/0194990 A1* | 8/2011 | Hsu | B01J 21/063 422/211 |
| 2011/0224376 A1 | 9/2011 | Zhai et al. | |
| 2012/0037854 A1 | 2/2012 | Worsley et al. | |
| 2012/0077006 A1 | 3/2012 | Worsley et al. | |
| 2013/0184144 A1 | 7/2013 | Liang et al. | |
| 2016/0030908 A1* | 2/2016 | Horvath | B82Y 30/00 429/231.5 |
| 2016/0223269 A1 | 8/2016 | Hartmann et al. | |

OTHER PUBLICATIONS

C. Dechakiatkrai et al., "Photocatalytic Oxidation of Methanol Using Titanium Dioxide/Single-Walled Carbon Nanotube Composite." Journal of the Electrochemical Society, 154 (5), pp. A407-A411. (Year: 2007).*
Hartmann P et al., "Mesoporous TiO2: Comparison of Classical Sol-Gel and Nanoparticle Based Photoelectrodes for the Water Splitting Reaction," ACS Nano 2010, 4(6):3147-3154.
Khan S. et al., "Efficient photochemical water splitting by a chemically modified n—TiO2 2," Science 2002, 297(5590):2243-2245.
Fujishima A. et al., "Electrochemical Photolysis of Water at a Semiconductor Electrode," Nature 1972, 238(5358):37.
Li L et al., "Heterostructured Ceramic Powders for Photocatalytic Hydrogen Production: Nanostructured TiO2 Shells Surrounding Microcrystalline (Ba,Sr)TiO3 Cores," Journal of the American Ceramic Society, 2012, 95(4):1414-1420.
Li L et al., "Photocatalysts with internal electric fields," Nanoscale 2014, 6(1):24-42.
Li L et al., "Heterostructured (Ba,Sr)TiO3/TiO2 core/shell photocatalysts: Influence of processing and structure on hydrogen production," International Journal of Hydrogen Energy, 2013, 38(17):6948-6959.
Oregan B et al., "A Low-Cost, High-Efficiency Solar-Cell Based on Dye-Sensitized Colloidal Tio2 Films," Nature, 1991, 353(6346):737-740.
Sauve G. et al., "Dye sensitization of nanocrystalline titanium dioxide with osmium and ruthenium polypyridyl complexes," Journal of Physical Chemistry B, 2000, 104(29):6821-6836.

Adhyalsa G. et al., "Broadband energy transfer to sensitizing dyes by mobile quantum dot mediators in solar cells," Scientific Reports 2013, 3, pp. 1-29.
Hoffman M. et al., "Environmental Applications of Semiconductor Photocatalysis," Chemical Reviews, 1995, 95(1):69-96.
Yao Y et al., "Photoreactive TiO2/carbon nanotube composites: Synthesis and reactivity," Environmental Science & Technology, 2008, 42(13):4952-4957.
Li L et al., "Visible light photochemical activity of heterostructured PbTiO3—TiO2 core-shell particles," Catalysis Science & Technology, 2012, 2(9):1945-1952.
Du J. et al., "Hierarchically Ordered Macro-Mesoporous TiO2-Graphene Composite Films: Improved Mass Transfer, Reduced Charge Recombination, and Their Enhanced Photocatalytic Activities," Acs Nano 2011, 5(1):590-596.
Ni M et al., "A review and recent developments in photocatalytic water-splitting using TiO2 for hydrogen production," Renewable & Sustainable Energy Reviews, 2007, 11(3):401-425.
Zheng Q et al., "Self-organized TiO2 nanotube array sensor for the determination of chemical oxygen demand," Advanced Materials 2008, 20(5):1044-1049.
Roy P. et al., "TiO2 Nanotubes: Synthesis and Applications," Angewandte Cinemie-International Edition, 2011, 50(13):2904-2939.
Lee W. et al., "Biomineralized N-Doped CNT/TiO2 Core/Shell Nanowires for Visible Light Photocatalysis," Acs Nano 2012, 6(1):935-943.
Kongkanand A. et al., "Single wall carbon nanotube scaffolds for photoelectrochemical solar cells. Capture and transport of photogenerated electrons," Nano Letters 2007, 7(3):676-680.
Zhang H. et al., "P25-Graphene Composite as a High Performance Photocatalyst," ACS Nano, 2010, 4(1):380-386.
Yang et al., "Photocatalytic Properties of Graphdiyne and Graphene Modified TiO2: From Theory to Experiment," ACS Nano, 2013, 7(2):1504-1512.
Zhang X.Y., "Graphene/TiO2 nanocomposites: synthesis, characterization and application in hydrogen evolution from water photocatalytic splitting," Journal of Materials Chemistry, 2010, 20(14):2801-2806.
Cui G.W. et al., "Rational design of carbon and TiO2 assembly materials: covered or strewn, which is better for photocatalysis?," Chemical Communications, 2013 49(57):6415-6417.
Lee D.K. et al., "Graphitic domain layered titania nanotube arrays for separation and shuttling of solar-drivin electrons," Journal of Materials Chemistry, 2013, 1(2):203-207.
Cong Yu Li et al., Carbon-doped TiO2 coating on multiwalled carbon nanotubes with higher visible light photocatalytic activity, Applied Catalysis B-Environmental, 2011, 107(1-2):128-134.
Martel R. et al., "Single and multi-wall carbon nanotube field-effect transistors," Applied Physics Letters, 1998, 73(17):2447-2449.
Kongkanand A. et al., "Electron storage in single wall carbon nanotubes. Fermi level equilibration in semiconductor—SWCNT suspensions," ACS Nano, 2007, 1(1):13-21.
Woan et al., "Photocatalytic Carbon-Nanotube-TiO2 Composites," Advanced Materials, 2009, 21(21):2233-2239.
Peigney A. et al., "Specific surface area of carbon nanotubes and bundles of carbon nanotubes," Carbon 2001, 39(4):507-514.
Wang W.D. et al., "Visible light photodegradation of phenol on MWNT-TiO2 composite catalysts prepared by a modified sol-gel method," Journal of Molecular Catalysis a-Chemical, 2005, 235(1-2):194-199.
Ou Y et al., "MWNT-TiO2: Ni composite catalyst: A new class of catalyst for photocatalytic H-2 evolution from water under visible light illumination," Chemical Physics Letters, 2006, 429(1-3):199-203.
Dang X.N. et al., "Virus-templated self-assembled single-walled carbon nanotubes for highly efficient electron collection in photovoltaic devices," Nature Nanotechnology, 2011, 6(6):377-384.
Mamba G et al., "Gadolinium nanoparticle-decorated multiwalled carbon nanotube/titania nanocomposites for degradation of methylene blue in water under simulated solar light," Environmental Science and Pollution Research, 2014, 21(8):5597-5609.

(56) References Cited

OTHER PUBLICATIONS

Chen W. et al., "Enhanced Visible-Light Activity of Titania via Confinement inside Carbon Nanotubes," Journal of the American Chemical Society, 2011, 133(38):14896-14899.
Djokic V.R. et al., "The dependence of the photocatalytic activity of TiO2/carbon nanotubes nanocomposites on the modification of the carbon nanotubes," Ceramics International, 2014, 40(3):4009-4018.
Zhou W. et al., "Photodegradation of organic contamination in wastewaters by bondingTiO2/single-walled carbon nanotube composites with enhanced photocatalytic activity," Chemosphere, 2010, 81(5):555-561.
Kocha S.S. et al., "Photoelectrochemical decomposition of water utilizing monolithic tandem cells," Solar Energy Materials and Solar Cells, 1998, 52(3-4):389-397.
Bryning M.B. et al., "Carbon nanotube aerogels," Advanced Materials, 2007, 19(5):661-664.
Kim K.H. et al., "Mechanical and Thermal Management Characteristics of Ultrahigh Surface Area Single-Walled Carbon Nanotube Aerogels," Advanced Functional Materials, 2013, 23(3):377-383.
Islam M.F. et al., "High weight fraction surfactant solubilization of single-wall carbon nanotubes in water," Nano Letters, 2003, 3(2):269-273.
Kim K.H. et al., "Graphene coating makes carbon nanotube aerogels superelastic and resistant to fatigue," Nature Nanotechnology, 2012, 7(9):562-566.
Kim K. H. et al., "Single-Walled Carbon Nanotube Aerogel-Based Elastic Conductors," Advanced Materials, 2011, 23(25):2865.
Islam M.F. et al., "Direct measurement of the polarized optical absorption cross section of single-wall carbon nanotubes," Physical Review Letters, 2004, 93(3):037404-1-037404-4.
Hough L.A. et al., "Structure of semidilute single-wall carbon nanotube suspensions and gels," Nano Letters, 2006, 6(2):313-317.
Hough L.A. et al., "Viscoelasticity of single wall carbon nanotube suspensions," Physical Review Letters, 2004, 93(16): 168102-1-168102-4.
Sakthivel S. et al., "Daylight photocatalysis by carbon-modified titanium dioxide," Angewandte Chemie-International Edition, 2003, 42(40):4908-4911.
Brunauer S. et al., "Adsorption of gases in multimolecular layers," Journal of the American Chemical Society, 1938, 60:309-319.
Barrett E.P. et al., "The Determination of Pore Volume and Area Distributions in Porous Substances .1. Computations from Nitrogen Isotherms," Journal of the American Chemical Society, 1951, 73(1):373-380.
Gomez-Navarro C. et al., "Electronic transport properties of individual chemically reduced graphene oxide sheets," Nano Letters, 2007, 7(11):3499-3503.
Tauc J. et al., "Optical Properties and Electronic Structure of Amorphous Germanium," Physica Status Solidi, 1966, 15(2):627-637.
Liao L.B. et al., "Efficient solar water-splitting using a nanocrystalline CoO photocatalyst," Nature Nanotechnology, 2014, 9(1):69-73.
Mizoguchi H. et al., "A germanate transparent conductive oxide," Nature Communications, 2011, 2, pp. 1-5.
Tang H. et al., "Electrical and Optical-Properties of TiO2 Anatase Thin-Films," Journal of Applied Physics, 1994, 75(4):2042-2047.
Yeon S. et al., "Preparation of Nanotube TiO2-Carbon Composite and Its Anode Performance in Lithium-Ion Batteries," Electrochemical and Solid State Letters, 2009, 12(2):A28-A32.
Long M.C. et al., "Origin of Visible Light Photoactivity of Reduced Graphene Oxide/TiO2 by in Situ Hydrothermal Growth of Undergrown TiO2 with Gmphene Oxide," Journal of Physical Chemistry C, 2013, 117(32):16734-16741.
Carrcon M.A. et al., "Pore architecture affects photocatalytic activity of periodic mesoporous nanocrystalline anatase thin films," Journal of Material Chemistry, 2007, 17(1):82-89.
Xing M et al., "Synergistic Effect on the Visible Light Activity of Ti3+ Doped TiO2 Nanorods/Boron Doped Graphene Composite," Sci. Rep. 2014, 4, pp. 1-13.
Lee J.S. et al., "Highly Photoactive, Low Bandgap TiO2 Nanoparticles Wrapped by Graphene," Adv. Mater, 2012, 24:1084-1088.
D.E. Johnston et al., "Electronic devices based on purified carbon nanotubes grown by high-pressure decomposition of carbon monoxide," Nat. Mater. 4, 589-592 (2005).
Baughman et al., "Giant-Stroke, Superelastic Carbon Nanotube Aerogel Muscles," Science 2009, 323, pp. 1575-1578.
Kimura et al., "Shape memory effect and mechanical properties of carbon nanotube/shape memory polymer nanocomposites," Composite Structures, 2007, 81, pp. 176-184.
Zhao et al., "Near-Infrared Fluorescent Materials for Sensing of Biological Targets," Sensors 2008, 8, pp. 3082-3105.
Definition of Throughout, Merriam-Webster, 1 page.

\* cited by examiner

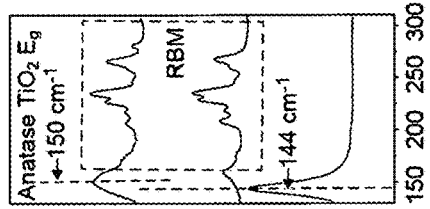
FIG. 5A
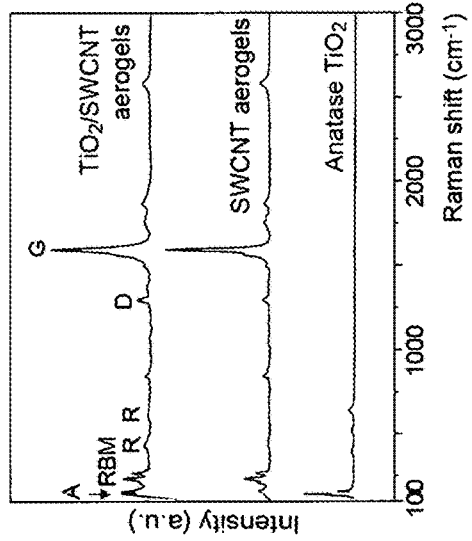
FIG. 5B
FIG. 5C
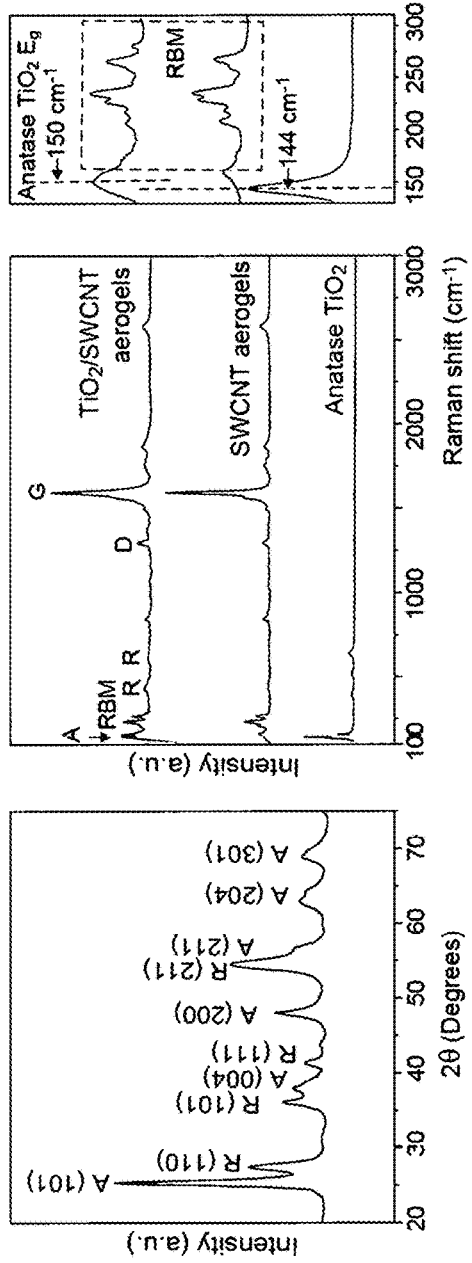
FIG. 5D
FIG. 5E
FIG. 5F

PHOTOCATALYST / CARBON NANOTUBE AEROGEL COMPOSITES

CROSS-REFERENCE TO RELATED APPLICATION

This application claims the benefit of U.S. Patent Application Ser. No. 62/600,252 entitled "PHOTOCATALYST AND CARBON NANOTUBE AEROGEL COMPOSITES" and filed on Feb. 16, 2017, which is hereby incorporated by reference in its entirety.

STATEMENT OF GOVERNMENT SUPPORT

This invention was made with government support under Grant Nos. CMMI-1335417 and DMR-1206656 awarded by the National Science Foundation. The government has certain rights in the invention.

TECHNICAL FIELD

This invention relates to aerogel composites including a porous carbon nanotube network and photocatalyst nanoparticles bonded to carbon nanotubes in the porous carbon nanotube network.

BACKGROUND

Solar energy, a major renewable energy source, is increasingly being explored to produce hydrogen fuel via water splitting, to generate electricity in solar cells, and to remediate water of heavy metals and organic matter through the use of photocatalysts. Titania ($TiO_2$) is perhaps the most extensively studied photocatalyst because it is abundant, inexpensive, stable in photochemical environments, and generates electron-hole pairs at energy levels appropriate to split water. Unfortunately, titania is a relatively poor photocatalyst because its large bandgap of 3.2 eV only allows absorption of ultraviolet (UV) light, which is only 5% of the total solar energy, and its fast electron-hole recombination rate leads to high losses. Titania typically requires cathodic cocatalysts such as platinum to reduce electron-hole recombination and to generate measurable photoactivity. Composites of titania and various carbon materials, such as carbon nanotubes (CNTs), graphene, and graphite have been explored to narrow titania's bandgap by carbon doping and to reduce photogenerated electron-hole recombination through efficient charge transfer from titania to carbon materials. However, the photocatalytic performance of such composites can be limited by low transparency or porosity of the substrate and surface area to volume ratio of the titania.

SUMMARY

In a first general aspect, forming a photocatalyst/aerogel composite includes contacting an aerogel including a porous carbon nanotube network with a solution including a photocatalyst precursor to yield a wet gel. The porous carbon nanotube network includes carbon nanotubes, nodes, and struts. Each node is defined by a region in which two of the carbon nanotubes are in direct contact with each other, and each strut is defined by one of the carbon nanotubes extending between a first node and a second node. Forming the photocatalyst/aerogel composite further includes initiating a chemical reaction in the wet gel to form, on the nodes and struts, photocatalyst nanoparticles from the photocatalyst precursor, and removing liquid from the wet gel to yield an aerogel composite defining pores and including the photocatalyst nanoparticles. The photocatalyst nanoparticles are covalently bonded to the nodes and the struts throughout the porous carbon nanotube network.

Implementations of the first general aspect may include one or more of the following features.

The photocatalyst precursor may include a metal, such as a metal salt (e.g., a metal nitrate hydrate or a metal halide), a metal hydroxide, or a metal alkoxide. The photocatalyst may include a metal oxide (e.g., an amorphous metal oxide or a crystalline metal oxide). In some instances, the photocatalyst includes at least one of titania, iron oxide, zinc oxide, zinc iron oxide, cobalt iron oxide, tungsten oxide, copper iron oxide, silver phosphate, bismuth vanadate, indium tantalite, and oxynitride. The solution including the photocatalyst precursor may be a nonaqueous solution including a polar organic solvent.

In some implementations, initiating the chemical reaction includes initiating a hydrolysis reaction, a reduction reaction, or a precipitation reaction. Removing the liquid from the wet gel may include exchanging the liquid in the wet gel with a nonaqueous solvent.

In certain implementations, the photocatalyst nanoparticles are amorphous, and the aerogel composite is annealed to yield crystalline nanoparticles covalently bonded to the nodes and the struts throughout the porous carbon nanotube network. The aerogel may be formed before contacting the aerogel with the solution.

The aerogel may include co-catalyst nanoparticles. The co-catalyst nanoparticles may include a metal, such as platinum or palladium. The co-catalyst (or a metal in the co-catalyst) typically differs from the photocatalyst (or a metal in the photocatalyst or photocatalyst precursor). The co-catalyst nanoparticles may be formed in the aerogel before forming the aerogel composite. The co-catalyst nanoparticles may be formed within the aerogel composite. A chemical composition of the co-catalyst nanoparticles may differ from a chemical composition of the photocatalyst nanoparticles.

In a second general aspect, a photocatalyst/aerogel composite includes a carbon nanotube network and photocatalyst nanoparticles. The carbon nanotube network defines pores and includes carbon nanotubes, nodes, and struts. The carbon nanotubes may be single-wall carbon nanotubes. Each node is defined by a region in which two of the carbon nanotubes are in direct contact with each other, and each strut is defined by one of the carbon nanotubes extending between a first one of the nodes and a second one of the nodes. The photocatalyst nanoparticles have an average diameter in a range between 1 nm and 20 nm and are covalently bonded to the nodes and the struts throughout the carbon nanotube network.

Implementations of the second general aspect may include one or more of the following features.

The carbon nanotubes may include single-wall carbon nanotubes, multi-wall carbon nanotubes, or both. The photocatalyst nanoparticles may include a metal oxide, such as titania. In some implementations, the photocatalyst nanoparticles include at least one of titania, iron oxide, zinc oxide, zinc iron oxide, cobalt iron oxide, tungsten oxide, copper iron oxide, silver phosphate, bismuth vanadate, indium tantalite, and oxynitride. The photocatalyst nanoparticles may have an average diameter in a range between 1 nm and 10 nm, or between 1 nm and 5 nm.

In some instances, a porosity of the composite may be in a range between 90% and 99%. As used herein, "porosity"

refers to the percentage of the volume of voids with respect to the total volume of the composite. In certain instances, a porosity of the composite is at least 99%. An average diameter of the pores may be in a range between 1 nm and 10 nm. A density of the composite may be in a range between 36 mg/mL and 500 mg/mL. A density of the photocatalyst nanoparticles in the composite may be in a range between 26 mg/mL and 390 mg/mL. A density of the carbon nanotubes in the composite may be in a range between 5 mg/mL and 15 mg/mL.

In some implementations, the composite includes co-catalyst nanoparticles throughout the carbon nanotube network, wherein the co-catalyst nanoparticles differ from the photocatalyst nanoparticles. In certain implementations, the co-catalyst nanoparticles are coated with the photocatalyst. A density of the co-catalyst nanoparticles in the composite may be in a range between 0.1 mg/mL and 1 mg/mL.

In a third general aspect, a photocatalyst/aerogel composite includes a carbon nanotube network and titania nanoparticles. The carbon nanotube network defines pores and includes single-wall carbon nanotubes, nodes, and struts. Each node is defined by a region in which two of the single-wall carbon nanotubes are in direct contact with each other, and each strut is defined by one of the single-wall carbon nanotubes extending between a first node and a second node. The titania nanoparticles have an average diameter in a range between 1 nm and 20 nm and are covalently bonded to the nodes and the struts throughout the carbon nanotube network.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A shows an X-ray diffraction (XRD) pattern of a $TiO_2$/SWCNT aerogel composite. FIG. 5B shows Raman spectra from $TiO_2$/SWCNT aerogel composites, SWCNT aerogels, and anatase titania. FIG. 5C shows the anatase $E_g$ and radial breathing modes (RBMs) of titania and SWCNTs, respectively. FIGS. 5D-5F show X-ray photoelectron spectroscopy (XPS) spectra from $TiO_2$/SWCNT aerogel composites for the 1 s core level of carbon (C), the 2p core level of titanium (Ti), and the 1 s core level of oxygen (O), suggesting Ti—C and Ti—O—C bonding between $TiO_2$ and SWCNTs.

DETAILED DESCRIPTION

Figure 1:
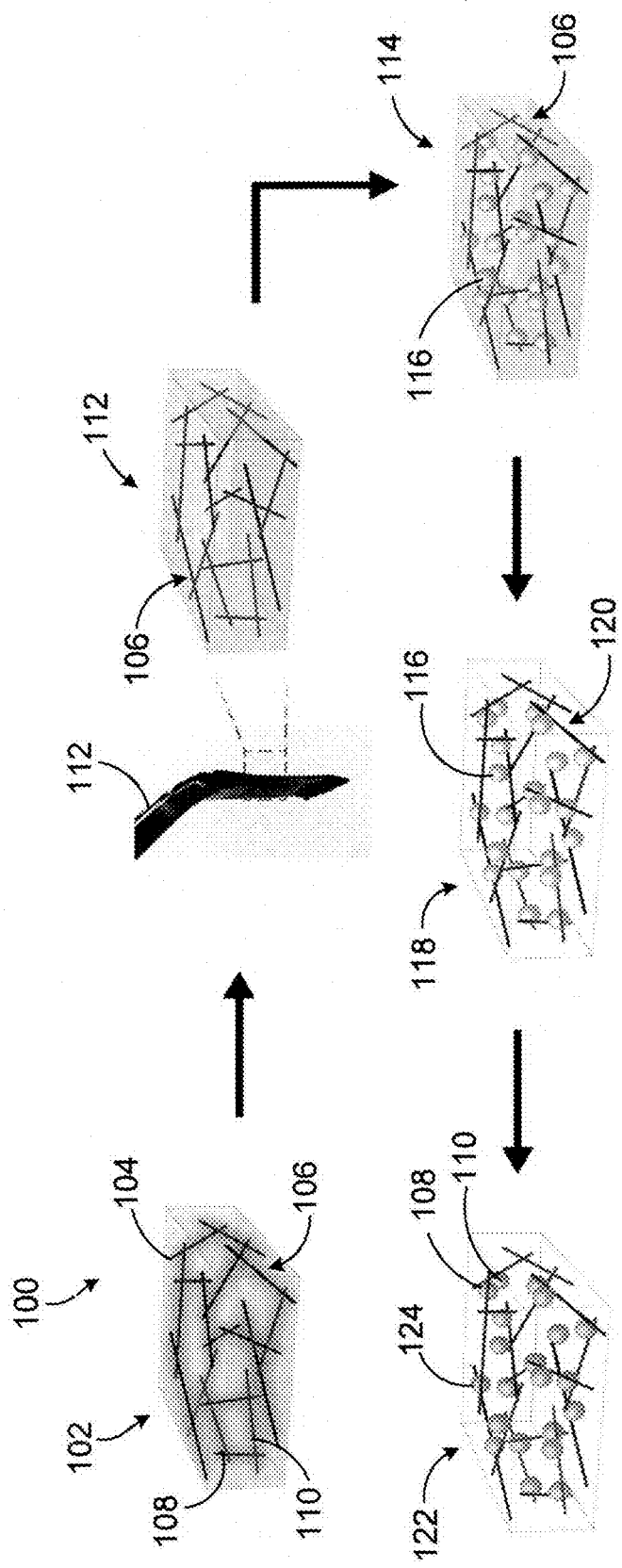
FIG. 1 depicts a synthetic route for the preparation of aerogel composites including a porous carbon nanotube (CNT) network and photocatalyst nanoparticles bonded to carbon nanotubes in the porous carbon nanotube network.

FIG. 1 depicts process 100 for synthesis of photocatalyst/CNT aerogel composites. Process 100 is an in-situ sol-gel synthesis in which photocatalyst nanoparticles are formed directly on a CNT network. In some instances, the photocatalyst nanoparticles include an oxide of one or more metals.

In process 100, a CNT hydrogel 102 is prepared by methods generally known in the art. As used herein, "hydrogel" generally refers to a gel in which the liquid component includes water. CNT hydrogel 102 may include single-wall CNTs (SWCNTs), multi-wall CNTs (MWCNTs), or both. Preparing CNT hydrogel 102 includes combining CNTs 104 and surfactant in water to yield a mixture, sonicating and then centrifuging the mixture, and concentrating the supernatant. The concentrated supernatant is in the form of a suspension that typically forms hydrogel 102 including a network 106 of CNTs 104 within a few hours. CNT network 106 includes CNTs, 104, nodes 108, and struts 110, with each node defined by a region in which two of the CNTs are in direct contact with each other, and each strut defined by one of the carbon nanotubes extending between a first node and a second node.

Hydrogel 102 is washed to remove the surfactant. After washing, surfactant in hydrogel 102 is below the detection limit of energy dispersive X-ray (EDX) spectroscopy (e.g., less than 1 wt % residual surfactant remains after washing). Thus, aerogel composites formed in process 100 are free or substantially free of surfactant. In some instances, water in hydrogel 102 is exchanged with a nonaqueous solvent to yield wet gel 112 including CNT network 106. As used herein, "wet gel" generally refers to a gel that includes water or other solvent as a liquid component. In some instances, the liquid component in wet gel 112 is nonaqueous. The nonaqueous liquid component may be substantially anhydrous. Suitable nonaqueous solvents include polar and nonpolar organic solvents. Examples of suitable solvents include ethanol, tetrahydrofuran, dimethylformamide, dimethylsulfoxide, toluene, chloroform, and acetone.

Photocatalyst nanoparticles are synthesized directly on the CNTs 104 in CNT network 106 in wet gel 112 to yield amorphous metal oxide/CNT wet gel 114. Suitable photocatalyst nanoparticles include metal oxides such as titania, iron oxide, zinc oxide, zinc iron oxide, cobalt iron oxide, tungsten oxide, and copper iron oxide. Other suitable photocatalyst nanoparticles include silver phosphate, bismuth vanadate, indium tantalite, and oxynitrides. Nanoparticle synthesis may occur via a sol-gel process in which wet gel 112 is contacted with (e.g., soaked in) a solution including photocatalyst precursor and a solvent. Contacting typically occurs for a length of time in a range between 30 minutes and six hours (e.g., two hours). The solution may be heated to a temperature in a range between 20° C. and 80° C. (e.g., 50° C.). Suitable photocatalyst precursors include metal salts (e.g., metal nitrate hydrates, metal halides), metal hydroxides, and metal alkoxides. A concentration of the photocatalyst precursor in the solution is typically in a range between 1 millimolar (mM) and 100 mM. Suitable solvents include solvents described previously with respect to wet gels. A molar ratio of the photocatalyst precursor to the solvent is typically in a range between 1:10 and 1:100. After an appropriate length of time, the wet gel is removed from the solution. A chemical reaction is initiated in the wet gel to form, on the nodes and struts of CNT network 106, photocatalyst nanoparticles 116 from the photocatalyst precursor. Initiating the chemical reaction may include initiating a hydrolysis reaction, a reduction reaction, a precipitation reaction, or other appropriate reaction, based at least in part on the photocatalyst precursor and the liquid present in photocatalyst/CNT wet gel 114. Photocatalyst nanoparticles 116 may be metal oxide nanoparticles. In some instances, photocatalyst nanoparticles 116 are amorphous.

Liquid is removed from photocatalyst/CNT wet gel 114 to yield porous photocatalyst/CNT aerogel composite 118. Porous photocatalyst/CNT aerogel composite 118 includes porous CNT network 120. Porous CNT network 120 defines pores and includes photocatalyst nanoparticles 116 covalently bonded to nodes 108 and struts 110 throughout the porous CNT network. In some instances, removing the liquid from the photocatalyst/CNT wet gel includes exchanging the liquid in the wet gel with a nonaqueous (e.g., anhydrous) solvent followed by critical point drying to remove the solvent. Photocatalyst/CNT aerogel composite 118 may be annealed to yield photocatalyst/CNT aerogel composite 122 having crystalline photocatalyst nanoparticles 124 covalently bonded to nodes 108 and struts 110 throughout the photocatalyst/CNT aerogel composite. Suitable temperatures for annealing are between 450° C. and 1200° C. (e.g., 600° C.) for a length of time between 30 minutes and 4 hours. The crystalline photocatalyst nanoparticles may be crystalline metal oxide nanoparticles (e.g., anatase titania nanoparticles).

In some instances, a photocatalyst/CNT aerogel composite includes co-catalyst nanoparticles (e.g., metal nanoparticles) in addition to the photocatalyst nanoparticles (e.g., metal oxide nanoparticles). The metal in the co-catalyst nanoparticles may be different from the metal in the photocatalyst nanoparticles. In one example, the co-catalyst nanoparticles include platinum or palladium, and the photocatalyst nanoparticles include titania.

A photocatalyst/co-catalyst/CNT aerogel composite may be fabricated by contacting photocatalyst/CNT wet gel 114 with a solution including a metal salt, and initiating a chemical reaction to form metal nanoparticles from the metal in the metal salt. In one example, a photocatalyst/CNT wet gel is contacted with a solution including platinum ions (e.g., from hexachloroplatinic acid), and the platinum ions are reduced to form platinum nanoparticles on CNT network 106 in the photocatalyst/CNT wet gel 114. The resulting wet gel may be washed and dried to yield a photocatalyst/co-catalyst/CNT aerogel composite.

A photocatalyst/co-catalyst/CNT aerogel composite may be fabricated by depositing co-catalyst (e.g., metal) nanoparticles on a CNT network in a CNT hydrogel, followed by exchanging water in the co-catalyst/CNT hydrogel with a nonaqueous solvent, and growing photocatalyst nanoparticles on the co-catalyst/CNT hydrogel via a process such as that described with respect to FIG. 1. In some instances, the co-catalyst nanoparticles in the photocatalyst/co-catalyst/CNT aerogel composite may be coated with the photocatalyst (e.g., metal oxide).

Photocatalyst nanoparticles in photocatalyst/CNT aerogel composites described herein typically have an average diameter in a range between 1 nm and 20 nm, between 1 nm and 10 nm, or between 1 nm and 5 nm, and are covalently bonded to the nodes and the struts throughout the CNT network. In some examples, an average diameter of the pores in the CNT network is between 1 nm and 10 nm. In some examples, the CNTs are SWCNTs. In certain examples, the photocatalyst is amorphous titania or anatase titania. A porosity of aerogel composites described herein is typically in a range between 90% and 99%, between 95% and 99%, or between 98% and 99%. As used herein, "porosity" refers to the percentage of the volume of voids with respect to the total volume of the composite. In some instances, a porosity of aerogel composites described herein in is at least 99%. A density of an aerogel composite described herein is is typically between 36 mg/mL and 500 mg/mL, with a density of the photocatalyst nanoparticles in the aerogel composite typically between 26 mg/mL and 390 mg/mL and a density of the carbon nanotubes in the aerogel composite typically between 5 mg/mL and 15 mg/mL. For aerogel composites that include co-catalyst (e.g., metal) nanoparticles, a density of the co-catalyst nanoparticles in the aerogel composite is typically between 0.1 mg/mL and 1 mg/mL or between 0.3 mg/mL and 1 mg/mL.

Methods described herein may be used to fabricate aerogel composites including a variety of photocatalysts, such as titania, iron oxide, zinc iron oxide, silver phosphate, cobalt iron oxide, tungsten iron oxide, tungsten oxide, copper iron oxide, bismuth vanadate, indium tantalite, and oxynitrides. These aerogel composites are freestanding, with the CNT network serving as the substrate. These aerogel composites may be incorporated into materials and devices for a variety of applications. In one example, electrodes suitable for use in photoelectrochemical fuel cells, solar cells, and energy storage and conversion systems may be fabricated to include aerogel composites described herein.

EXAMPLES

Fabrication of SWCNT Hydrogels and Wet Gels

Purified SWCNTs (CoMoCAT CG 200; Southwest Nanotechnologies) with diameters of 1.0±0.3 nm and lengths of ~1 mm were mixed with sodium dodecylbenzene sulfonate surfactant (SDBS; Acros Organics) at a SWCNT concentration of 1 mg mL$^{-1}$ and a SWCNTs:SDBS weight ratio of 1:10 in deionized water (Ultrapure Milli-Q, resistivity 18.2 MΩ cm). The mixtures were sonicated for 2 hours (h) at a power of 60 W using a probe tip sonicator (Thermo Fisher 500). The SWCNTs-SDBS suspensions were then centrifuged at 125,000×g for 19 min (Beckman Coulter Optima™ L-100 K) to pallet bundles, and retained mostly isolated nanotubes in the supernatant. The supernatant was decanted and the SWCNT concentration was measured using UV-vis-near infrared (NIR) spectroscopy (Cary 5000; Varian) with a known extinction coefficient of 2.6 (absorbance mL) (mg mm)$^{-1}$ at a wavelength of 930 nm. The suspensions were then concentrated to a final nanotube concentration of 3.5 mg mL$^{-1}$, where SWCNTs-SDBS suspensions typically form gels within a few hours. SWCNTs-SDBS suspensions were loaded into glass capillaries (Vitrocom) and held for 12 h to allow the suspensions to form hydrogels. The glass capillaries acted as molds to provide suitable shapes to the hydrogels for subsequent experiments. The surfactants were washed off using 1 molar (M) nitric acid for 20 min at 50° C. The hydrogels were removed from the capillaries and washed thoroughly with deionized water. Since titania could not be deposited on SWCNTs gels in water, the water was exchanged with solutions of increasing concentration of ethanol (EtOH) until the SWCNT networks were in pure anhydrous ethanol. Such SWCNT networks in ethanol are referred to herein as "SWCNT wet gels." In parallel, pristine SWCNT aerogels were fabricated by removing the anhydrous ethanol through a critical point drying process.

Fabrication of TiO$_2$/SWCNT Aerogel Composites

To synthesize titania nanoparticles on SWCNTs via the sol-gel method, titanium butoxide (TBOT; Acros Organics) was dissolved in anhydrous ethanol under a nitrogen atmosphere at a TBOT:EtOH molar ratio of 1:100. The SWCNT wet gels were soaked in the TBOT solution for 2 h at 50° C. and then were removed from TBOT solution. Excess solution was wiped from the wet gel surfaces using a wet lint-free wiper (Kimwipes; Kimtech) to prevent titania formation on the surfaces. TBOT was hydrolyzed to make titania by adding water dropwise to an amount that was about half the volume of the hydrogels. The hydrolysis process was allowed to proceed for a half an hour, after which the wet gels were washed with ethanol several times to remove unreacted TBOT. Titania that formed within the wet gels was amorphous. To transform amorphous TiO$_2$/SWCNT wet gels into aerogel composites, the ethanol was thoroughly exchanged with anhydrous ethanol, which was followed by critical point drying (Autosamdri 815, Tousimis) to remove anhydrous ethanol. Finally, amorphous-TiO$_2$/SWCNT aerogels were annealed at 600° C. for 2 h in argon to crystallize titania.

Fabrication of Pt/TiO$_2$/SWCNT and TiO$_2$/Pt/SWCNT Aerogel Compositess

To investigate the effect of metal cocatalysts on photocatalytic performance, Pt/TiO$_2$/SWCNT aerogel composites were prepared by depositing platinum nanoparticles within TiO$_2$/SWCNT aerogels. TiO$_2$/SWCNT aerogels were soaked in an aqueous solution of 10 mM hexachloroplatinic acid (H$_2$PtCl$_6$) under a low vacuum for ~1 h to remove any air bubbles trapped inside the aerogels and to facilitate solution infiltration. The samples were removed and were gently wiped using a wet lintfree wiper (Kimwipes; Kimtech) to remove excess solution from the surfaces and prevent platinum from forming at the surfaces in the next step. To create platinum nanoparticles, the H$_2$PtCl$_6$ solution within the gel was reduced by dropwise addition of 0.5 mL of sodium borohydride (NaBH$_4$) solution, which was prepared by mixing 40 mM NaBH$_4$ with 20 mM of sodium hydroxide (NaOH) solution. The reduction process was allowed to proceed for ~30 min, after which the sample was washed with deionized water to remove unreacted H$_2$PtCl$_6$, NaBH$_4$, and NaOH solutions. Next, the water inside of the Pt/TiO$_2$/SWCNT hydrogels was exchanged with solutions of increasing concentration of ethanol until the gels were in pure anhydrous ethanol. These gels were finally dried with a critical point dryer.

TiO$_2$/Pt/SWCNT aerogels were fabricated by first making SWCNT hydrogels, then depositing platinum nanoparticles onto SWCNTs, followed by exchanging water with anhydrous ethanol, and lastly growing titania within Pt/SWCNT wet gels. The reagents and their concentrations, as well as the synthesis steps for making platinum and titania nanoparticles, were identical to the process described previously.

The dimensions of pristine SWCNT aerogels were 25 mm×3.5 mm×0.35 mm (length×width×thickness), which were determined by glass capillary, and had a mass of 0.28 mg, measured using a balance (XS205; Mettler Toledo) that has a resolution of 0.01 mg, corresponding to an average density of ~9 mg mL$^{-1}$ and an average volume fraction of ~0.006. The dimensions of the SWCNT aerogels remained the same but the masses increased after decorating with titania and platinum, which were measured using the same balance. The average density of the TiO$_2$/SWCNT aerogels was ~36 mg mL$^{-1}$, which corresponds to a volume fraction of ~0.01, a titania mass loading per unit cross-sectional area of 2 mg cm$^{-2}$, and a porosity of ~99%. The platinum mass loading within the Pt/TiO$_2$/SWCNT and TiO$_2$/Pt/SWCNT aerogel composites s was ~0.35 mg mL$^{-1}$, while the titania and SWCNT values were similar to those in the TiO$_2$/SWCNT aerogel compositess.

Microstructure Characterization

High-resolution SEM and conventional-resolution TEM images were taken with a spherical aberration corrected FEI Quanta 600 and a Tecnai F20 at 200 kV, respectively. The Raman spectra were collected using a Raman confocal microscope (inVia Raman microscope, Renishaw) with a 50×, 0.75 N.A. air objective (Leica Microsystems) and with a 785 nm (1.58 eV) laser. The laser power was set to 10 mW, the spot size was ~1-2 mm, and exposure times were ~1 s. Five scans were collected at every location, and five different locations were investigated for each sample to verify uniformity. The results of the 25 scans were averaged to improve the signal-to-noise ratio. Each Raman spectrum was normalized by its G-band intensity. Data collection and analysis was done with the WiRE software (Renishaw). SSA, pore diameter (2r), pore volume (V), and pore diameter distributions (dV/dr) of SWCNT and TiO$_2$/SWCNT aerogels were determined using nitrogen adsorption and desorption measurements carried out at 77 K in a surface area analyzer (Micromeritics Gemini VII 2390) and calculated with the BET method. The pore diameters, pore volume, and pore diameter distributions were calculated using the BJH method using the desorption branch of the isotherms. X-ray diffraction (XRD) was measured using CuKα radiation (λ=1.54056 Å) with X'Pert Pro MPD X-ray Diffractometer at 40 kV and 30 mA. X-ray photoelectron spectroscopy (XPS) data were collected with a DESA 150 analyzer (Staib instruments) and AlKa X-rays from a TX400/2 X-ray gun (PSP vacuum technology) as a probe. Elemental analysis was carried out using CasaXPS. The absorbance characteristics of titania and all the aerogels were measured using a Cary 5000 UV-vis-NIR spectrometer (Varian), and their reflectance characteristics were measured using a OL 770-LED multichannel spectroradiometer with a cold cathode mercury (Hg) vapor lamp as a light source. Structural stability characterization by immersion in water. Both freestanding SWCNT aerogels sand $TiO_2$/SWCNT aerogel composites of known physical dimensions were submerged in distilled water, placed in a low vacuum environment to facilitate water infiltration into the nanopores of the aerogels, and removed from the vacuum once air bubbles stopped escaping from the aerogels (~15 min). Such samples were then held in water for ~5 h while their physical dimensions were measured once per hour.

Photocatalytic Degradation of Methylene Blue Dye

For dye degradation experiments, the aerogels were cut into dimension of 7.5 mm×3.5 mm×0.35 mm (length× width×thickness), and mass of each component was calculated based on the average densities of the pristine, $TiO_2$/SWCNT, $TiO_2$/Pt/SWCNT and Pt/$TiO_2$/SWCNT aerogels. Test samples were either 0.25 mg of titania P25 particulates, 0.08 mg of SWCNT aerogels, 0.33 mg of $TiO_2$/SWCNT aerogel composites (composed of 0.25 mg titania and 0.08 mg SWCNTs), or 0.333 mg of $TiO_2$/Pt/SWCNT or Pt/$TiO_2$/SWCNT aerogel composites (composed of 0.25 mg titania, 0.003 mg platinum, and 0.08 mg SWCNTs). To measure photocatalytic performance, a test sample was stirred using a magnetic stir bar in 5 mL of an aqueous solution having 0.02 mM methylene blue in a glass vial for 24 h in the dark to achieve equilibrium for dye adsorption on the test sample prior to visible-light irradiation. To confirm that the dye adsorption on the test sample equilibrated during 24 h of soaking, 0.5 mL of dye solution was periodically removed and its absorbance characterized beginning at 18 h. The aerogels were suspended in solution using a metal mesh to avoid any mechanical disintegration from collision with the magnetic stir bar. The dye concentration in solution was dramatically decreased after the 24 h equilibration time; hence, in all photocatalysis experiments, the value of $C_0$ corresponded to the value measured after the dye adsorption equilibration.

For the reusability test, the test sample was removed from the dye solution after the first cycle of visible-light dye degradation measurements, rinsed in water, and then soaked it in a 0.02 mM dye solution in the dark for 24 hours to achieve dye adsorption equilibration. Next, the residual dye concentration in the solution was measured to determine dye adsorption on test samples during the second cycle. The test sample was submerged in a dye solution with the same $C_0$ used in the first cycle to maintain the same dye:titania molar ratio, and dye degradation was measured. This process was repeated for the third cycle and the dye degradation was measured again. The light source was a 300 W Hg lamp that had a UV cut-off filter that transmitted light with wavelengths $\lambda > 420$ nm, an IR cut-off filter that blocked light with $\lambda \geq 1200$ nm, and a cooling system. The absorbance of the dye solution was measured periodically using a Varian Cary 5000 UV-vis-NIR spectrometer by sampling 0.5 mL of the solution. For mixtures containing titania P25, the withdrawn solution was first centrifuged at 21,000×g to sediment the P25 particles prior to absorbance measurements. Photocatalytic dye degradation measurements at each condition were repeated with at least three different samples.

Figure 2A:
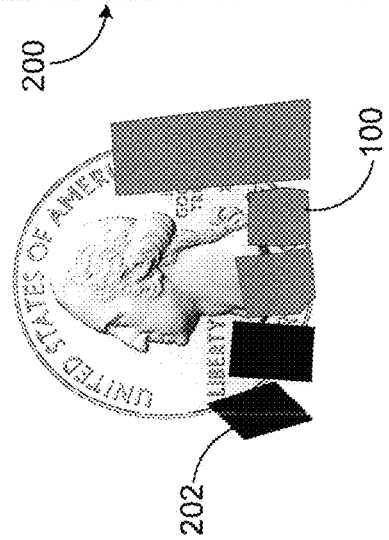
FIG. 2A is a photograph showing CNT aerogels and $TiO_2$/single-wall CNT (SWCNT) aerogel composites.
Figure 2B:
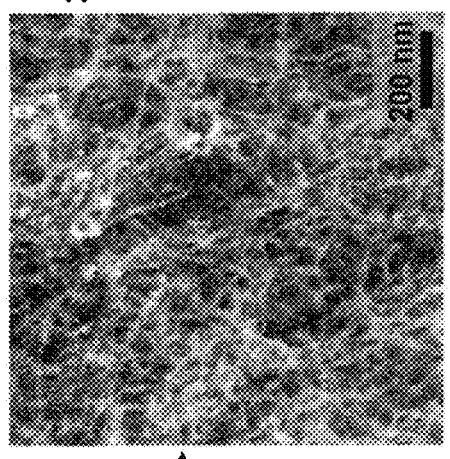
FIG. 2B is a scanning electron microscopy (SEM) image of a cross-section of a $TiO_2$/SWCNT aerogel composite.
Figure 2C:
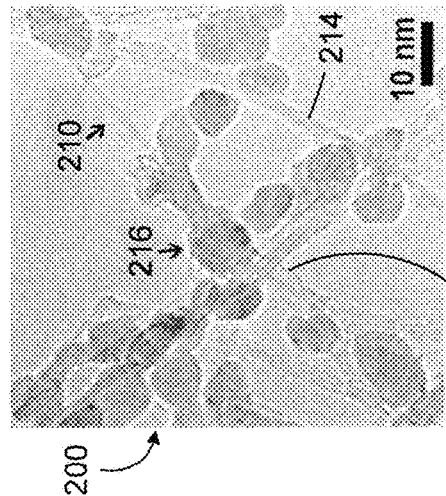
FIG. 2C is a transmission electron microscopy (TEM) image of a cross-section of a $TiO_2$/SWCNT aerogel composite.

FIG. 2A is a photograph showing freestanding $TiO_2$/SWCNT aerogel composites 200 and SWCNT aerogels 202. The SWCNT aerogels appeared black, whereas the $TiO_2$/SWCNT aerogels were slightly grey due to the presence of titania. In one example, $TiO_2$/SWCNT aerogel composite 200 can be used as or incorporated into an electrode for a variety of applications. FIG. 2B is a high-resolution SEM image of a cross-section of a $TiO_2$/SWCNT aerogel composite 200. FIG. 2C is a conventional resolution TEM image of a cross-section of a $TiO_2$/SWCNT aerogel composite 200 with a porous carbon nanotube network including SWCNTs 210. The $TiO_2$/SWCNT aerogel composite 200 includes nodes 212 and struts 214. Each node 212 is defined by a region in which two of the SWCNTs 210 are in direct contact with each other, and each strut is defined by one of the carbon nanotubes extending between a first node and a second node. $TiO_2$ nanoparticles 216 are formed on and covalently bonded to nodes 212 and struts 214 throughout the porous carbon nanotube network. These images show that the porous, uniform, and isotropic nanotube network of the underlying SWCNT aerogels remained intact through the titania deposition process.

$TiO_2$ nanoparticles 216 were observed to form at nodes 212, likely because titania nanoparticles preferentially nucleated at the nodes, which have a lower surface energy compared to the struts. The average diameter of the titania nanoparticles was ~9 nm. Based on the total titania mass in the $TiO_2$/SWCNT aerogel composites and the average titania nanoparticle diameter measured, the titania nanoparticle loading per unit cross-sectional area was estimated to be $~1.25 \times 10^{18}$ nanoparticles $cm^{-2}$.

Figure 3A:
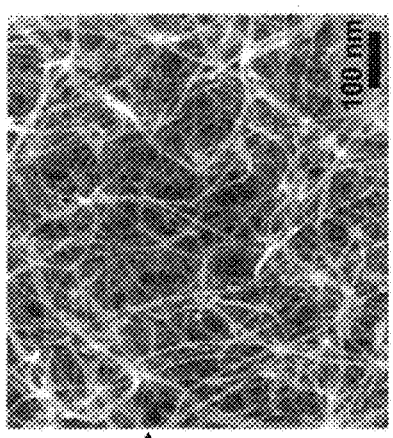
FIG. 3A is a SEM image of a cross-section of a CNT aerogel.
Figure 3B:
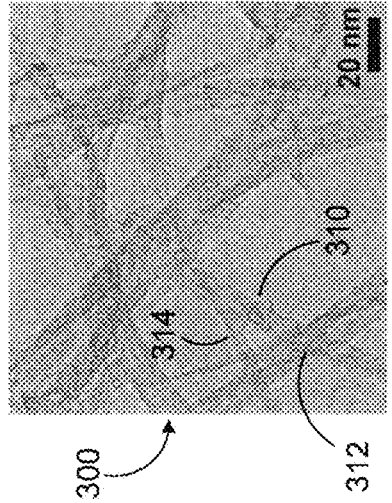
FIG. 3B is a TEM image of a cross-section of a CNT aerogel.

Images of SWCNT aerogels were taken for comparison. FIG. 3A is a high-resolution SEM image of a cross section of a SWCNT aerogel 300. FIG. 3B is a conventional resolution TEM image of a cross section of a SWCNT aerogel 300 with a porous carbon nanotube network including SWCNTs 310. The SWCNT aerogel 300 includes nodes 312 and struts 314. Each node 312 is defined by a region in which two of the SWCNTs 310 are in direct contact with each other, and each strut is defined by one of the carbon nanotubes extending between a first node and a second node.

Figure 4A:
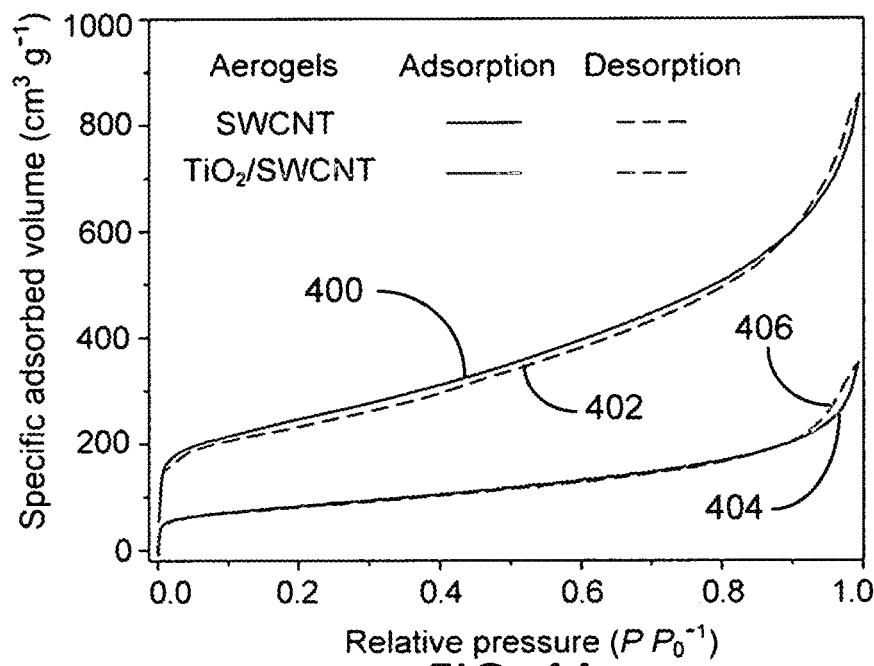
FIG. 4A shows nitrogen adsorption-desorption isotherms of SWCNT aerogels and $TiO_2$/SWCNT aerogel composites with mass density of 9 mg mL$^{-1}$ and ≈36 mg mL$^{-1}$, respectively. Specific adsorbed volume was calculated by dividing measured adsorbed volume by the mass of the sample and is plotted against the relative pressure, $PP_0^{-1}$, where P and $P_0$ are the equilibrium pressure and saturation pressure of nitrogen at the adsorption temperature of 77 K, respectively.
Figure 4B:
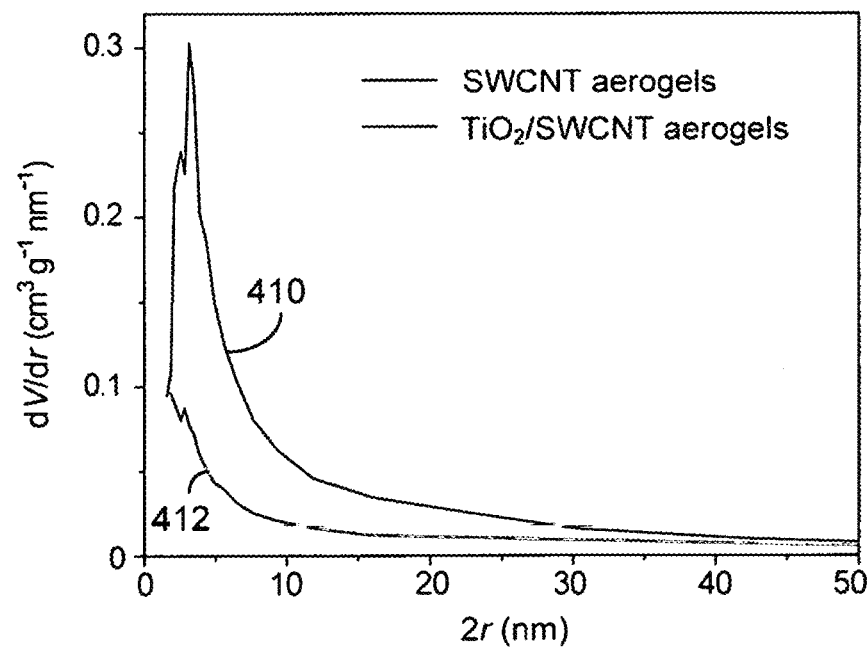
FIG. 4B shows pore diameter distributions (dV/dr) of SWCNT aerogels and $TiO_2$/SWCNT aerogel composites as a function of pore diameter (2r). The pore characteristics within SWCNT aerogels can be tuned by changing the SWCNT concentration.

The microstructure of $TiO_2$/SWCNT aerogel composites was further characterized by measuring the SSA and the pore size distributions using Brunauer-Emmet-Teller (BET) and Barrett-Joyner-Halenda (BJH) methods. The BET surface area of the underlying SWCNT aerogels of density 9 mg $mL^{-1}$ was 857 $m^2$ $g^{-1}$, which decreased to 293 $m^2$ $g^{-1}$ after 27.5 mg $mL^{-1}$ of titania loading. FIG. 4A shows nitrogen adsorption-desorption isotherms of SWCNT and $TiO_2$/SWCNT aerogel composites with mass density of ~9 mg $mL^{-1}$ and ~36 mg $mL^{-1}$, respectively. Specific adsorbed volume was calculated by dividing measured adsorbed volume by the mass of the sample and is plotted against the relative pressure, $PP_0^{-1}$, where P and $P_0$ are the equilibrium pressure and saturation pressure of nitrogen at the adsorption temperature of 77 K, respectively. The BET based SSA for both type of aerogels were calculated from the measured adsorption data shown in FIG. 4A, where plots 400 and 402 show adsorption and desorption for SWCNT aerogels, respectively, and plots 404 and 406 show adsorption and desorption for $TiO_2$/SWCNT aerogel composites, respectively. The BJH pore sizes of the $TiO_2$/SWCNT aerogel composites were between 2 and 25 nm, with a majority of pores being less than 10 nm. In contrast to SWCNT aerogels, $TiO_2$/SWCNT aerogel composites had a substantially smaller fraction of pores with diameters less than 5 nm, likely because those pores became closed by titania nanoparticles. FIG. 4B shows pore diameter distributions (dV/dr) of SWCNT aerogels and TiO$_2$/SWCNT aerogel composites as a function of pore diameter (2r). The pore characteristics within SWCNT aerogels can be tuned by changing the SWCNT concentration. Plots 410 and 412 in FIG. 4B show pore diameters for SWCNT aerogels, TiO$_2$/SWCNT aerogel composites, respectively. Pores in the TiO$_2$/SWCNT aerogel composites are large enough to allow for facile transport of dye and ionic species. Both titania and SWCNT surfaces can adsorb dye molecules (the latter via π-π interactions on the SWCNT) and facilitate dye degradation during light irradiation.

The crystallinity and the relevant phases of titania in the TiO$_2$/SWCNT aerogel composites were determined using powder X-ray diffraction (XRD), and a representative XRD pattern is shown in FIG. 5A. The pattern displayed distinct diffraction peaks associated with both the anatase (JCPDS 21-1272) and the rutile (JCPDS 04-0551) crystalline phases, and are identified by "A" and "R", respectively, in FIG. 5A. The annealing of TiO$_2$/SWCNT aerogel composites at 600° C. that typically transforms titania from anatase phase to rutile phase likely caused titania in our samples to possess both types of phases.

The structural integrity of the TiO$_2$/SWCNT aerogel composites and the interactions between titania and the SWCNTs were characterized using Raman spectroscopy, and compared with titania and SWCNTs. FIG. 5B shows Raman spectra of TiO$_2$/SWCNT aerogel composites, SWCNT aerogels, and anatase TiO$_2$. FIG. 5C shows a magnified view of these spectra from about 150 cm$^{-1}$ to about 300 cm$^{-1}$. Raman spectra of TiO$_2$/SWCNT aerogel composites displayed distinct features associated with SWCNTs as well as anatase (A) and rutile (R) titania (FIG. 5B). The intensity ratio ID/IG between the SWCNT D-band at ~1300 cm$^{-1}$, which characterizes the sp$^3$-hybridized carbon in the aerogels, and the G-band at ~1591 cm$^{-1}$ of TiO$_2$/SWCNT aerogel composites relative to pristine SWCNT aerogels was used to characterize damage or structural defects in SWCNTs from titania deposition. The G-band is a characteristic Raman feature of SWCNTs and quantifies the sp$^2$-hybridized carbon bonds in the aerogels. The ID/IG for TiO$_2$/SWCNT aerogel composites increased only slightly to 0.11 from 0.07 for SWCNT aerogels, indicating only minimal damage to SWCNTs from titania deposition. Moreover, the Raman spectra displayed radial breathing modes (RBMs), which are exclusive features of SWCNTs, establishing that the SWCNTs remained intact in these TiO$_2$/SWCNT aerogel composites. Finally, the Raman spectra from pure anatase titania and TiO$_2$/SWCNT aerogel composites were compared. The in-house synthesized anatase titania powder was made using the same chemical reagents with identical reagent concentrations and reaction conditions that were used to synthesize TiO$_2$ within SWCNT aerogels, but the titania powder was annealed at 450° C. in air. The characteristic E$_g$ mode associated with anatase titania was blue shifted by 6 cm$^{-1}$ from 144 cm$^{-1}$ for pure anatase titania to 150 cm$^{-1}$ for TiO$_2$/SWCNT aerogel composites, indicating strong interactions between titania and SWCNTs, likely at the interface between the nanoparticles and SWCNTs. In spite of these strong interactions, there is only a minimal impact on the SWCNT structure. The intensities of Raman peaks at 439 cm$^{-1}$ and 608 cm$^{-1}$ in the spectra from TiO$_2$/SWCNT aerogel composites, which are attributed to rutile titania, were very small. Hence, shifts to these peaks to were not compared with Raman peaks from pure rutile titania.

The interactions between titania and SWCNTs were further investigated using X-ray photoelectron spectroscopy (XPS), focused on the C 1 s, Ti 2p, and O 1 s spectra shown in FIGS. 5D-5F, respectively. The 1 s core level spectrum of C can be deconvolved into five peaks (FIG. 5C). The two dominant peaks arise from SWCNTs, being the C=C peak at 283.8 eV and the C—C peak at 284.9 eV. The third largest peak arises from the C—O peak at 285.8 eV, which suggests that some oxygen formed bonds with SWCNTs. The last two peaks are associated with Ti and C interactions: a Ti—C peak at 282.4 eV and Ti—O—C peak at 287.2 eV. These last two peaks imply that bonding occurs between titania and carbon. Signatures of these bonds were also present in the deconvolved 2p core level spectrum of Ti (FIG. 5D). The Ti—O (Ti$^{4+}$) 2p$^{3/2}$ and 2p$^{1/2}$ peaks observed respectively at 459 eV and 464.8 eV are the primary peaks. In addition, Ti—C peaks are observed at 460.6 and 466.0 eV, and Ti—O—C peaks are observed at 457 and 463 eV. Finally, the 1 s core level spectrum of O (FIG. 5E) can be fitted into two peaks. The first peak at 530.5 eV can be attributed to Ti—O, while the peak at 532.7 eV can be attributed to C—O. Overall, XPS results support a strong bonding interaction between titania and SWCNTs within TiO$_2$/SWCNT aerogel composites, which could explain the small increase in ID/IG in Raman spectra for TiO$_2$/SWCNT aerogels (FIG. 5B). The structural integrity of SWCNTs, illustrated by Raman data, and the strong interactions between titania and SWCNTs should facilitate fast electron transfer into nanotubes, leading to a reduction in recombination of photogenerated electron-hole pairs and an enhancement in photocatalytic efficiency of the TiO$_2$/SWCNT aerogels.

Figure 6:
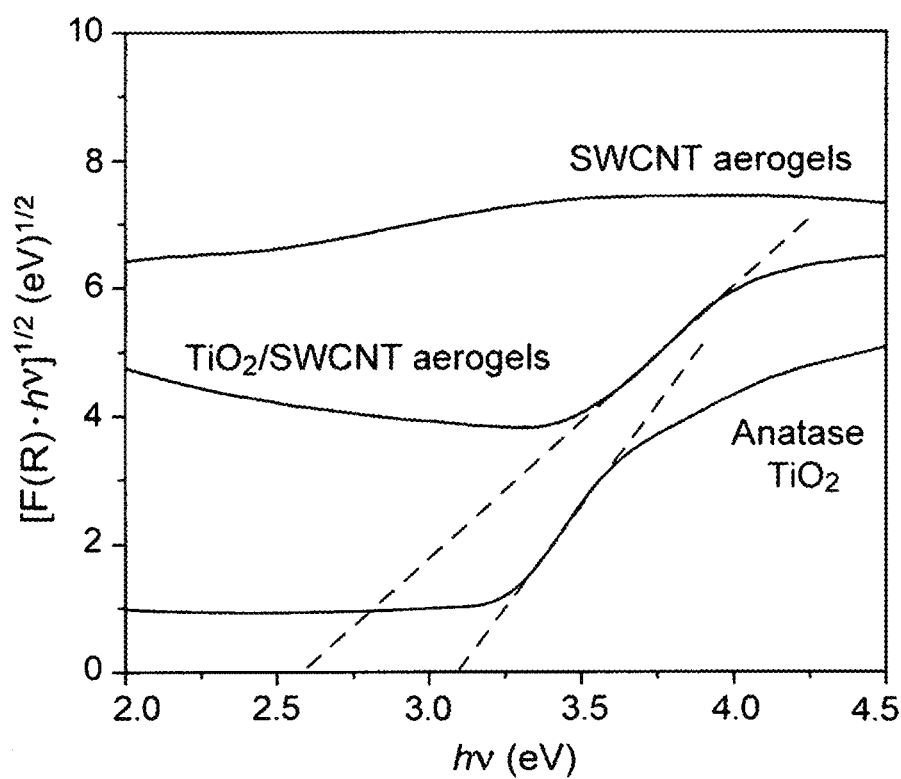
FIG. 6 show a Tauc plot of $[F(R)hv]^{1/2}$ versus photon energy hv to estimate the absorption edge of $TiO_2$/SWCNT aerogel composites.

The optical absorbance properties of the TiO$_2$/SWCNT aerogels and related materials, measured using UV-visible (vis) reflectance spectroscopy, are shown in FIG. 6. Anatase titania showed a significant reflectance across the visible spectrum, whereas the SWCNT and TiO$_2$/SWCNT aerogels showed minimal reflectance over the same range. To estimate the absorption edge of the TiO$_2$/SWCNT aerogel composites, the Kubelka-Munk function, F(R), was calculated from the reflectance (R) using the expression F(R)= (1−R)$^2$/2R and then plotted [F(R)hv]$^{1/2}$ as a function of photon energy hv. This type of plot is commonly known as a Tauc plot and can be used to estimate bandgaps of materials. Using this method, the anatase titania bandgap was observed near the expected value of ~3.2 eV.44. The SWCNT aerogels did not show a characteristic absorption edge, but rather a broad absorbance in the visible spectrum. The TiO$_2$/SWCNT aerogel composites showed intermediate behavior, exhibiting a baseline broad absorbance in the visible spectrum (attributed to the SWCNTs) with an abrupt increase near ~2.6 eV reminiscent of the anatase band edge absorption. In spite of the qualitative similarity, the absorption edge related to the anatase is shifted significantly into the visible region compared to pure anatase, likely because of the interfacial bonding between titania and carbon that was revealed through the Raman and XPS data.

Figure 7:
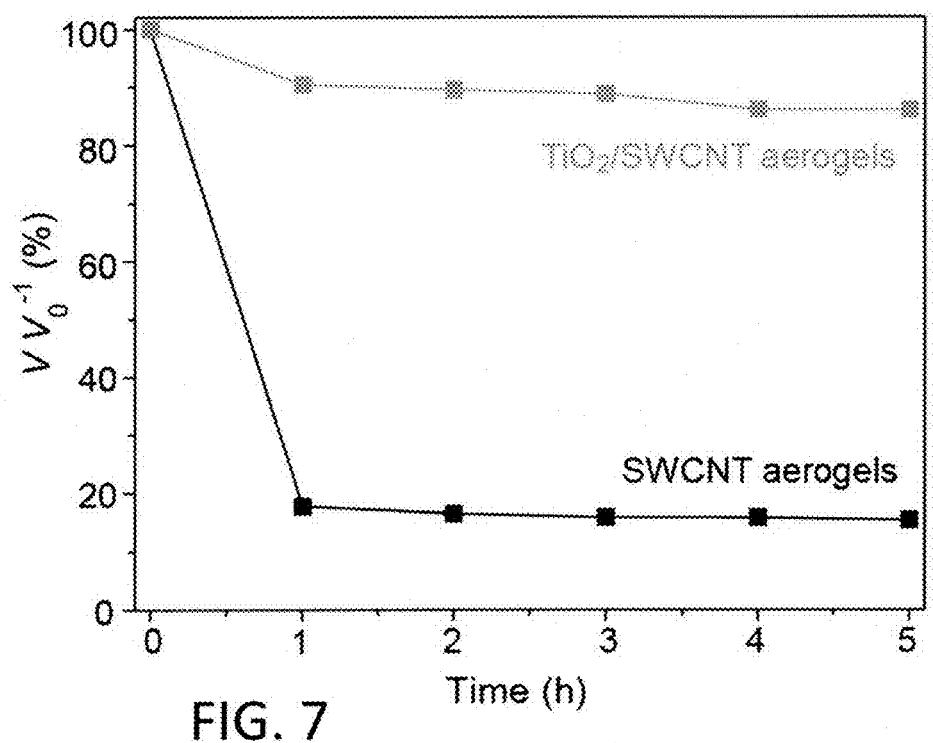
FIG. 7 shows a decrease in aerogel volumes after submersion in water for 5 hours. $V_0$ is the initial volume of aerogels and Vis the volume after submersion into water.
Figure 8:
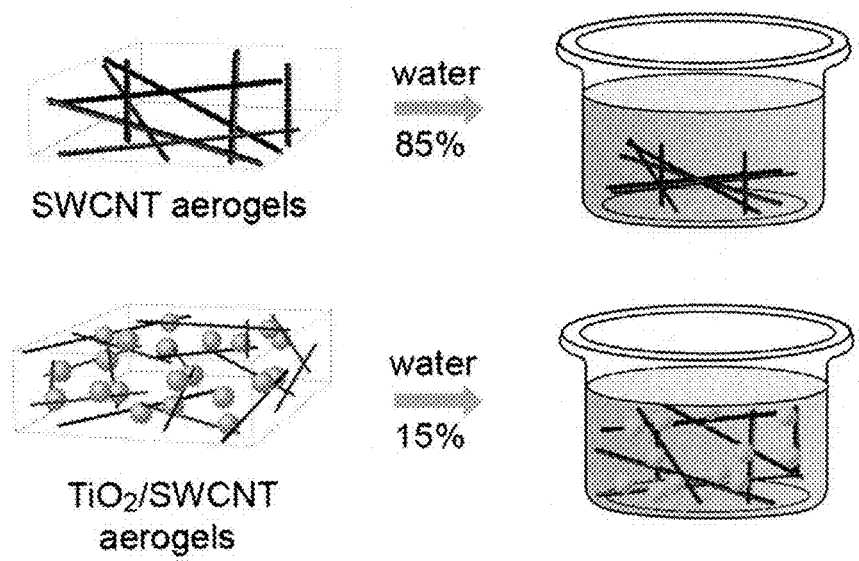
FIG. 8 depicts possible deformation processes of aerogels in water.

The titania deposition within SWCNT aerogels substantially improved the mechanical integrity of the nanotube networks in an aqueous environment. This was illustrated by the stability of the sample volume with respect to time in water shown in FIG. 7. The SWCNTs within the aerogels are typically held together only via van der Waals interactions at the nodes between the SWCNTs. As a result, SWCNT aerogels undergo structural collapse or significant plastic deformation (of >80%) in volume (as shown in FIG. 7) when they are submerged into water (or many other fluids), due to capillary forces arising from fluids wicking into the nanopores. Surprisingly, the volume of TiO$_2$/SWCNT aerogel composites only decreased by ~15% when they submerged into water. This can be understood if titania nanoparticles at nodes (see FIG. 2C) hinder nanotube rotation around the nodes, which is typically required for the aerogel to collapse. A schematic of possible deformation pathways for SWCNT and TiO$_2$/SWCNT aerogel composites in water is shown in FIG. 8. This improved stability allowed the aerogel composites to be tested for their photocatalytic performance as freestanding structures. Furthermore, it also suggests their use as stable electrodes (anodes) in photoelectrochemical cells. However, the bonding between titania and SWCNTs along with infiltration of the nodes between SWCNTs by titania, which improve visible-light absorption and mechanical stability, reduced the electrical conductivity of the underlying SWCNT aerogels. The native SWCNT aerogels had a conductivity of ~1.5 S cm$^{-1}$, while the TiO$_2$/SWCNT aerogels had a conductivity of 0.08 S cm$^{-1}$ (the conductivity of anatase titania was ~10$^{-12}$ S cm$^{-1}$). This decrease is likely related to the bonding between titania and SWCNTs, which is expected to disrupt the continuous sp$^2$-hybridized carbon bonds in the SWCNTs, and infiltration of the nodes by insulating titania that affected contacts between SWCNTs.

Figure 9:
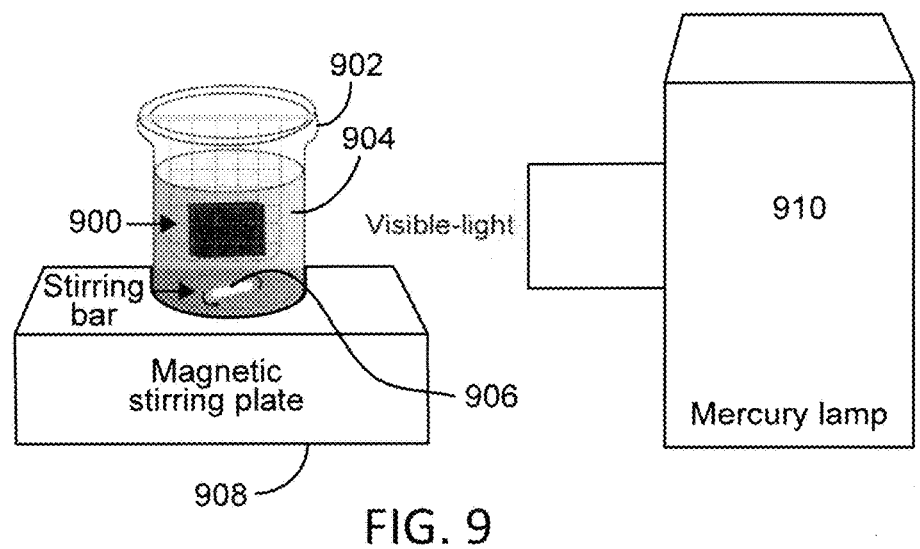
FIG. 9 depicts a photocatalytic dye degradation experimental setup.
Figure 10:
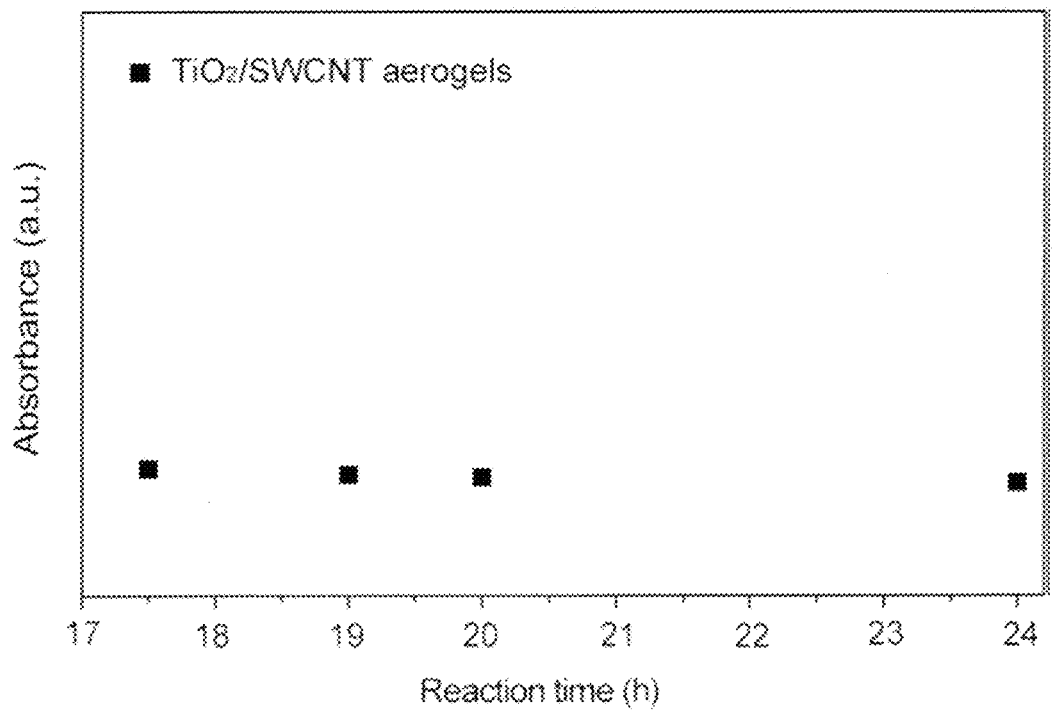
FIG. 10 shows equilibration time for methylene blue dye adsorption on $TiO_2$/SWCNT aerogel composites in the dark.

The photocatalytic activity of TiO$_2$/SWCNT aerogel composites was determined by measuring dye degradation over time under visible-light irradiation, and was compared to similar measurements on the dye alone, titania P25 particulates, and SWCNT aerogels. The experimental setup, as depicted in FIG. 9, includes TiO$_2$/SWCNT aerogel composite 900 in vessel 902 with dye solution 904 and stirring bar 906. With vessel 902 on magnetic stirring plate 908, dye solution 904 is irradiated with visible light from mercury lamp 910. As shown in FIG. 10, the dye concentration remained constant between 18-24 h for TiO$_2$/SWCNT aerogel composites submerged in dye solution in the dark, confirming that the dye adsorption on the aerogels reached equilibrium.

Figure 11:
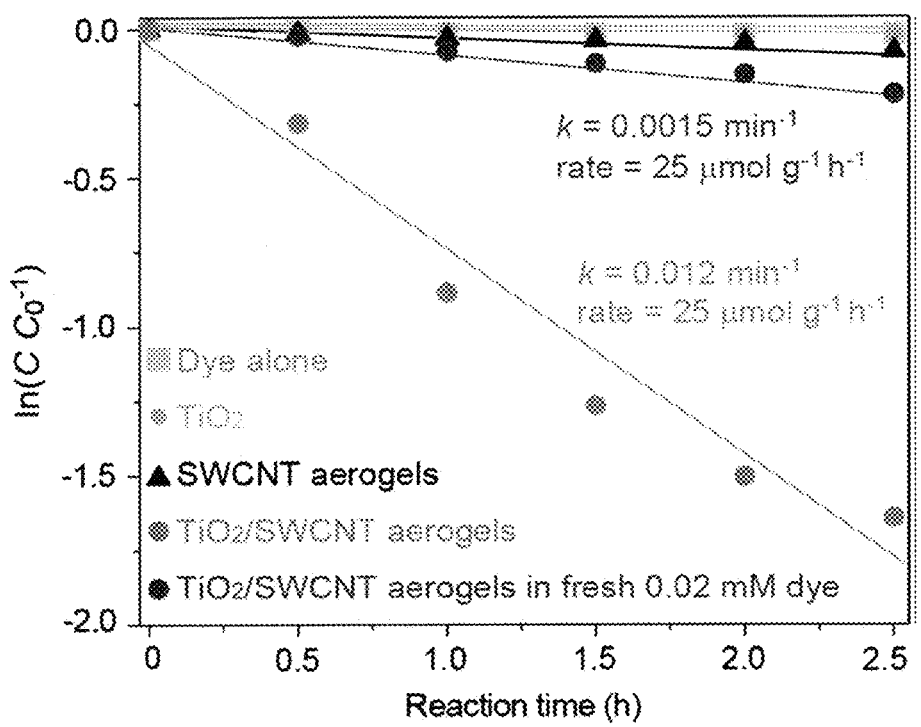
FIG. 11 shows photocatalytic degradation of methylene blue dye for samples containing dye alone, titania P25 particulates, SWCNT aerogels, $TiO_2$/SWCNT aerogel composites, and $TiO_2$/SWCNT aerogel composites in fresh 0.02 mM dye solution under visible-light irradiation ($\lambda$>420 nm) after adsorption-desorption equilibrium in the dark for 24 hours.

FIG. 11 shows equilibration time for methylene blue dye adsorption on TiO$_2$/SWCNT aerogel composites in the dark. The dye degradation for all samples is shown as $\ln(C\,C_0^{-1})$ versus time, where $C_0$ is the dye concentration after adsorption equilibration. Samples containing dye alone and titania P25 degraded negligible amounts of dye, and SWCNT aerogels degraded only slightly more. In contrast, TiO$_2$/SWCNT aerogel composites were much more active for dye degradation. To determine the dye degradation rate constant, k, it is customary to fit a pseudo-first-order model expressed as: $\ln(C\,C_0^{-1})=-kt$, where C is the concentration of dye after light exposure time, t. Using this model, k values of ~1×10$^{-4}$, 1×10$^{-4}$, and 5×10$^{-4}$ min$^{-1}$ were measured respectively for the dye alone, the titania P25 particulates, and the pristine SWCNT aerogels. The TiO$_2$/SWCNT aerogel composites had a rate constant that was more than two orders of magnitude larger at ~120×10$^{-4}$ min$^{-1}$. The degradation rate constant depends on the dye concentration and the molar ratio between the dye and the photocatalyst. Consequently, the photocatalytic dye degradation was assessed by the amount decomposed by unit mass of photocatalyst per unit time: i.e., in units of mmol g$^{-1}$ h$^{-1}$. In this method, the degradation rates for titania alone and pristine SWCNT aerogels were 0.1 mmol g$^{-1}$ h$^{-1}$ and 5 mmol g$^{-1}$ h$^{-1}$ (per SWCNT mass), respectively. No degradation rate for dye alone was calculated since the test sample did not have any photocatalyst. The degradation rate for the TiO$_2$/SWCNT aerogel composites was 25 mmol g$^{-1}$ h$^{-1}$. Taking $C_0$ to be the initial dye concentration (i.e., 0.02 mM) leads to significant overestimation of the degradation rate (~200 mmol g$^{-1}$h$^{-1}$). Results are shown in Table 1, which includes experimental conditions, rate performance, and other characteristics.

TABLE 1

Comparison of photocatalytic dye degradation performance by TiO$_2$ supported on CNTs

| Photocatalysts | Light source, power, spectral range | Adsorption-desorption equilibration time [h] | Dye:titania molar ratio[a] | Degradation rate[a] [μmol g$^{-1}$ h$^{-1}$] | Rate constant[a] [min$^{-1}$] |
|---|---|---|---|---|---|
| TiO$_2$/SWCNT aerogels | Hg, 300 W, visible | 24 | 0.004 | 25<br>200[b] | 0.012 |
|  |  | 24 | 0.032 | 25 (with fresh 0.02 mM dye solution) | 0.0015 |

[a]After dye adsorption to the samples had reached equilibrium in the dark.

The TiO$_2$/SWCNT aerogel composites maintained their mechanical integrity throughout the dye degradation experiments. Further, Raman spectroscopy showed that SWCNTs did not develop additional defects during these experiments. The transparency of SWCNT aerogels of thicknesses greater than ~100 mm is nearly zero. Consequently, titania deposited within SWCNT aerogels beyond this thickness would make negligible contribution to photocatalytic dye degradation, and a thinner TiO$_2$/SWCNT aerogel composite should provide a significantly larger dye degradation rate. It is believed that the high porosity of the SWCNT aerogels led to a relatively high volume for the amount of catalyst that contributed to large dye degradation rates.

Figure 12:
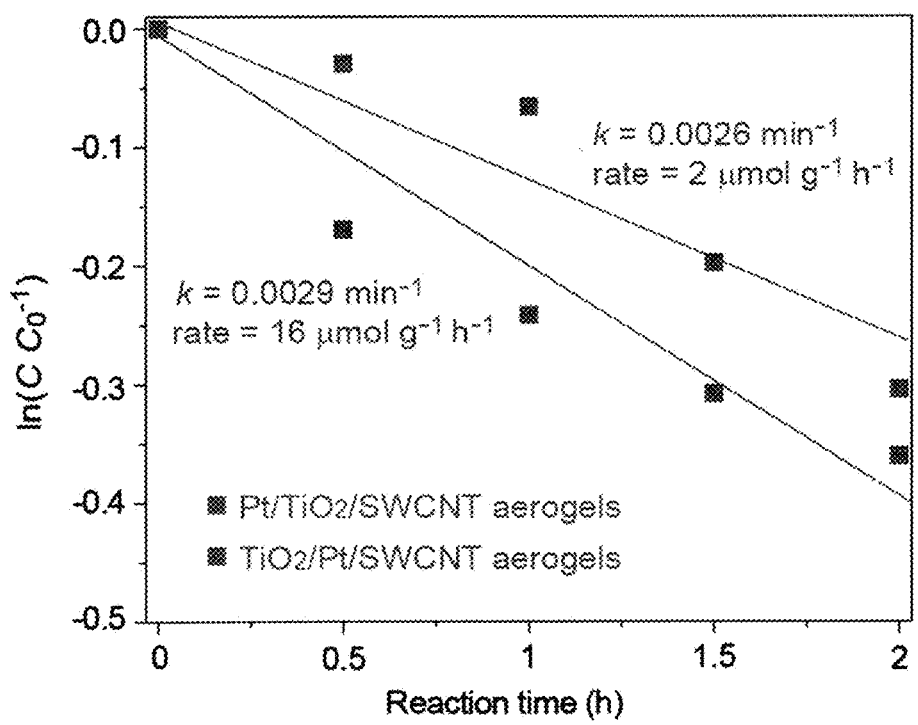
FIG. 12 shows photocatalytic degradation of methylene blue dye by Pt/$TiO_2$/SWCNT aerogel composites and $TiO_2$/Pt/SWCNT aerogel composites under visible light irradiation. Photodegradation capability of $TiO_2$/SWCNT aerogel composites did not improve with addition of Pt, suggesting that SWCNTs alone were sufficient at separating electron-hole pairs generated in $TiO_2$ under light irradiation.

To assess the dependence of the dye degradation on $C_0$, a subset of TiO$_2$/SWCNT aerogel composites were transferred to a fresh dye solution of concentration 0.02 mM after being soaked in 0.02 mM dye solution for 24 h in the dark. $C_0$ for this set of experiments (~0.02 mM) was an order of magnitude larger than $C_0$ in the previous set of experiments in which the equilibrated samples were kept in the dye solution containing residual unadsorbed dye (~0.0025 mM). The dye degradation results from these samples are shown in FIG. 12. The rate constant was ~6× smaller (~15×10$^{-44}$ min$^{-1}$), but the dye degradation rate was identical (25 mmol g$^{-1}$ h$^{-1}$). This suggests that the dye photodegradation capability of the TiO$_2$/SWCNT aerogel composites was limited by photocatalytic reactive sites and, hence, may be further enhanced using other photocatalysts.

The photochemical performance of Pt/TiO$_2$/SWCNT and TiO$_2$/Pt/SWCNT aerogel composites having the same platinum weight loading were also characterized. The Pt/TiO$_2$/SWCNT aerogel composites exhibited a significantly lower dye degradation rate under visible-light irradiation than the TiO$_2$/SWCNT aerogel composites, likely because platinum nanoparticles coated titania surfaces and thereby reduced the number of photocatalytically reactive sites. In support of this, the samples in which TiO$_2$ was deposited after the Pt, or the TiO$_2$/Pt/SWCNT aerogel composites, produced similar dye degradation rates to those of $TiO_2$/SWCNT aerogel composites under the same light irradiation. These results indicate that the $TiO_2$/SWCNT aerogel composites are not rate limited by the cathodic reaction, implying that separation and usage of the photogenerated carriers are rapid in these nanocomposites. This is supported by the observation that the high rate of photoactivity in these materials is limited by reaction sites at the surface.

Figure 13:
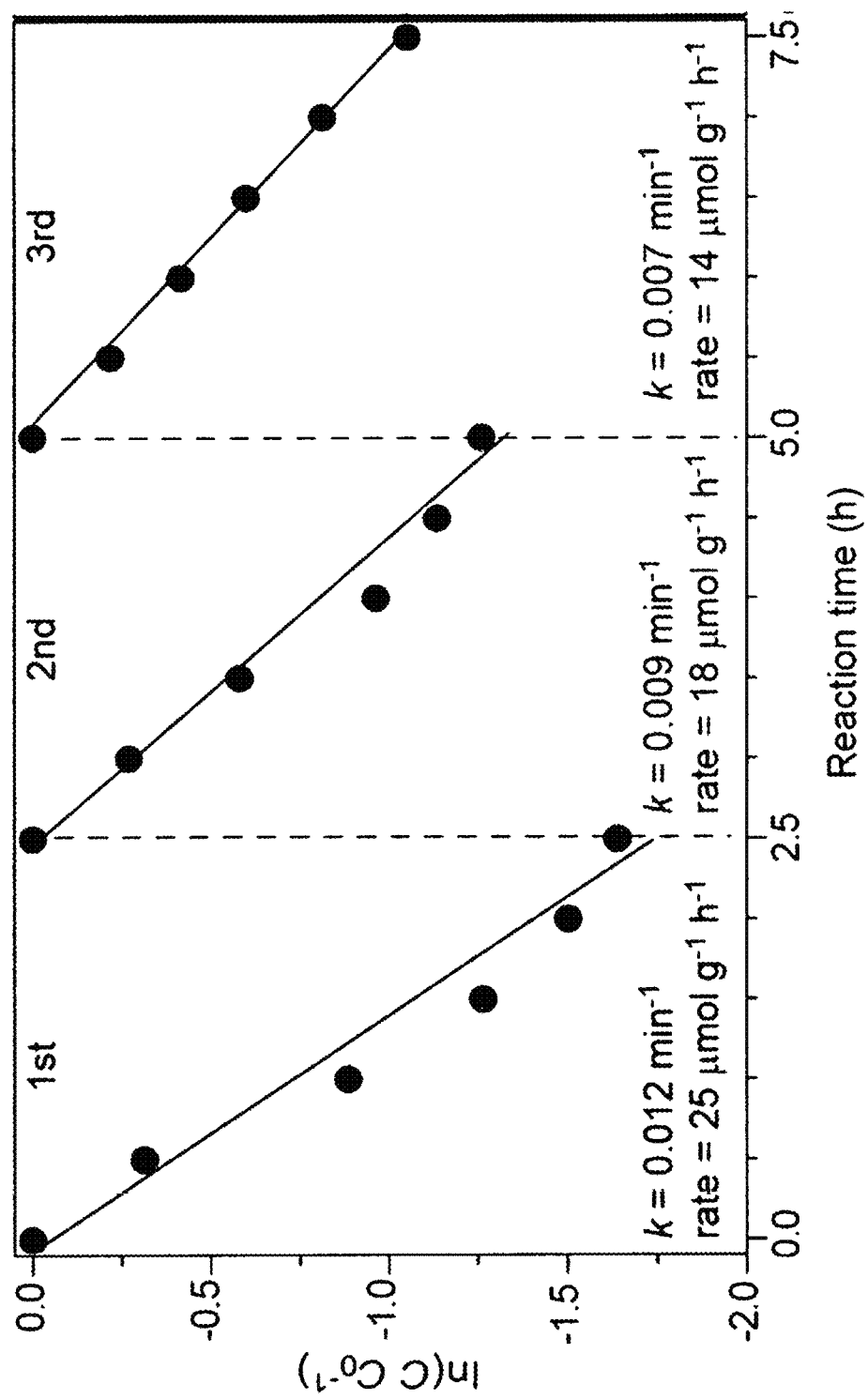
FIG. 13 shows reusability of $TiO_2$/SWCNT aerogel composites for methylene blue dye degradation. The aerogels were rinsed in water after every 2.5 hours of continuous use.

The reusability of $TiO_2$/SWCNT aerogel composites for methylene blue dye degradation was evaluated. The degradation rate constants and degradation rates are shown in FIG. 13. The experimental conditions, such as dye adsorption-desorption equilibration time, initial dye concentration, and dye:titania molar ratio were the same as previously described. Both k and the degradation rate during the second dye degradation cycle decreased by ~25%. During third cycle, again k and the degradation rate decreased by another ~22%. The amount of dye adsorbed on $TiO_2$/SWCNT aerogel composites during the dark equilibration time also decreased by ~15% in each reuse cycle. It is believed that dyes that adsorbed on SWCNTs but were not photodegraded could not be completely removed by rinsing the composites with water, resulting in lower dye adsorption during equilibration time, k, and degradation rates when the composites were reused. By way of explanation, some of the titania may have been dislodged from the composites during the rinsing step used to remove undegraded dye before reuse.

In summary, freestanding $TiO_2$/SWCNT aerogel composites that have high visible light photoactivity were fabricated. These composites were made by uniformly decorating aerogels of individually dispersed SWCNTs with titania nanoparticles. The bulk SWCNT aerogels have ultrahigh surface area and are able to support large amounts of titania nanoparticles, to maintain high porosity for efficient dye and ion transport, even after titania loading, and to retain high electrical conductivity for rapid distribution of charge carrier pairs. The results support strong bonding interactions between the titania and the SWCNTs without significant structural damage to nanotubes, which afford strong visible light absorption and facile electron injection into nanotubes that hinders recombination of photogenerated electron-hole pairs. Consequently, these $TiO_2$/SWCNT aerogel composites exhibited high photochemical activity as evidenced by their rapid dye degradation capabilities.

A number of embodiments have been described. Nevertheless, it will be understood that various modifications may be made without departing from the spirit and scope of disclosure. Accordingly, other embodiments are within the scope of the following claims.

What is claimed is:

1. A method of forming a photocatalyst/aerogel composite, the method comprising:
   contacting an aerogel comprising a porous carbon nanotube network with a solution comprising a photocatalyst precursor to yield a wet gel, wherein the porous carbon nanotube network comprises:
   carbon nanotubes;
   nodes, each node defined by a region in which two of the carbon nanotubes are in direct contact with each other; and
   struts, each strut defined by one of the carbon nanotubes extending between a first node and a second node;
   initiating a chemical reaction in the wet gel to form, on the nodes and struts, photocatalyst nanoparticles from the photocatalyst precursor; and
   removing liquid from the wet gel to yield an aerogel composite defining pores and comprising the photocatalyst nanoparticles, wherein the photocatalyst nanoparticles are covalently bonded to the nodes and the struts throughout the porous carbon nanotube network.

2. The method of claim 1, wherein the photocatalyst precursor comprises a metal.

3. The method of claim 1, wherein the photocatalyst precursor comprises a metal salt, a metal hydroxide, or a metal alkoxide.

4. The method of claim 1, wherein the photocatalyst comprises a metal oxide.

5. The method of claim 1, wherein the photocatalyst comprises at least one of titania, iron oxide, zinc oxide, zinc iron oxide, cobalt iron oxide, tungsten oxide, copper iron oxide, silver phosphate, bismuth vanadate, indium tantalite, and oxynitride.

6. The method of claim 1, wherein initiating the chemical reaction comprises initiating a hydrolysis reaction, a reduction reaction, or a precipitation reaction.

7. The method of claim 1, wherein removing the liquid from the wet gel comprises exchanging the liquid in the wet gel with a nonaqueous solvent.

8. The method of claim 1, wherein the photocatalyst nanoparticles are amorphous, and further comprising annealing the aerogel composite to yield crystalline nanoparticles covalently bonded to the nodes and the struts throughout the porous carbon nanotube network.

9. The method of claim 1, further comprising forming the aerogel before contacting the aerogel with the solution.

10. The method of claim 1, wherein the carbon nanotubes are single-wall carbon nanotubes.

11. A photocatalyst/aerogel composite comprising:
   a carbon nanotube network, wherein the carbon nanotube network defines pores and comprises:
   carbon nanotubes;
   nodes, each node defined by a region in which two of the carbon nanotubes are in direct contact with each other; and
   struts, each strut defined by one of the carbon nanotubes extending between a first node and a second node;
   photocatalyst nanoparticles, wherein the photocatalyst nanoparticles have an average diameter in a range between 1 nm and 20 nm and are covalently bonded to the nodes and the struts throughout the carbon nanotube network.

12. The composite of claim 11, wherein the carbon nanotubes comprise single-wall carbon nanotubes.

13. The composite of claim 11, wherein the photocatalyst nanoparticles comprise a metal oxide.

14. The composite of claim 11, wherein the photocatalyst comprises at least one of titania, iron oxide, zinc oxide, zinc iron oxide, cobalt iron oxide, tungsten oxide, copper iron oxide, silver phosphate, bismuth vanadate, indium tantalite, and oxynitride.

15. The composite of claim 11, wherein the photocatalyst nanoparticles have an average diameter in a range between 1 nm and 10 nm.

16. The composite of claim 11, wherein a porosity of the composite is between 90% and 99%.

17. The composite of claim 11, wherein an average diameter of the pores is between 1 nm and 10 nm.

18. The composite of claim 11, wherein a density of the composite is between 36 mg/mL and 500 mg/mL.

19. The composite of claim 11, wherein a density of the photocatalyst nanoparticles in the composite is between 26 mg/mL and 390 mg/mL.

20. A photocatalyst/aerogel composite comprising:
a carbon nanotube network, wherein the carbon nanotube network defines pores and comprises:
single-wall carbon nanotubes;
nodes, each node defined by a region in which two of the single-wall carbon nanotubes are in direct contact with each other; and
struts, each strut defined by one of the single-wall carbon nanotubes extending between a first node and a second node;
titania nanoparticles covalently bonded to the nodes and the struts throughout the carbon nanotube network, wherein the titania nanoparticles have an average diameter in a range between 1 nm and 20 nm.

* * * * *